United States Patent [19]

Angevine et al.

[11] 4,324,645
[45] Apr. 13, 1982

[54] UPGRADING RESIDUAL OIL

[75] Inventors: Philip J. Angevine, W. Deptford; Thomas R. Stein, Pennington, both of N.J.

[73] Assignee: Mobil Oil Corporation, New York, N.Y.

[21] Appl. No.: 147,033

[22] Filed: May 7, 1980

[51] Int. Cl.³ ............... C10G 45/00; B01J 23/16
[52] U.S. Cl. ........................... 208/50; 208/264; 252/465
[58] Field of Search ............... 208/50, 264; 252/465

[56] References Cited

U.S. PATENT DOCUMENTS

| 3,684,688 | 8/1972 | Roselius | 208/50 |
| 3,876,523 | 4/1975 | Rosinski | 208/89 |
| 3,931,052 | 1/1976 | Oleck | 252/465 |
| 3,977,961 | 8/1976 | Hamner | 208/264 |
| 3,977,962 | 8/1976 | Arey, Jr. | 208/264 |
| 4,016,067 | 4/1977 | Fischer | 208/89 |
| 4,054,508 | 10/1977 | Milstein | 208/89 |
| 4,082,695 | 4/1978 | Rosinski | 252/465 |

Primary Examiner—T. M. Tufariello
Attorney, Agent, or Firm—Charles A. Huggett; Michael G. Gilman; Dennis P. Santini

[57] ABSTRACT

Residual oil fractions are upgraded in that CCR is selectively removed without undue hydrogen consumption by hydroprocessing with a catalyst comprises a single metal such as molybdenum, tungsten, nickel, iron or palladium or multimetallic combination of such metals, excluding, however, active desulfurization compositions such as nickel molybdenum and nickel-tungsten. Said catalyst is characterized as having greater than about 50% of its pore volume contribution in pores having diameters in the range of between about 100 and 200 Angstroms. The product of such hydroprocessing is a particularly preferable feedstock for coking to give more liquid yield and less coke make.

13 Claims, 1 Drawing Figure

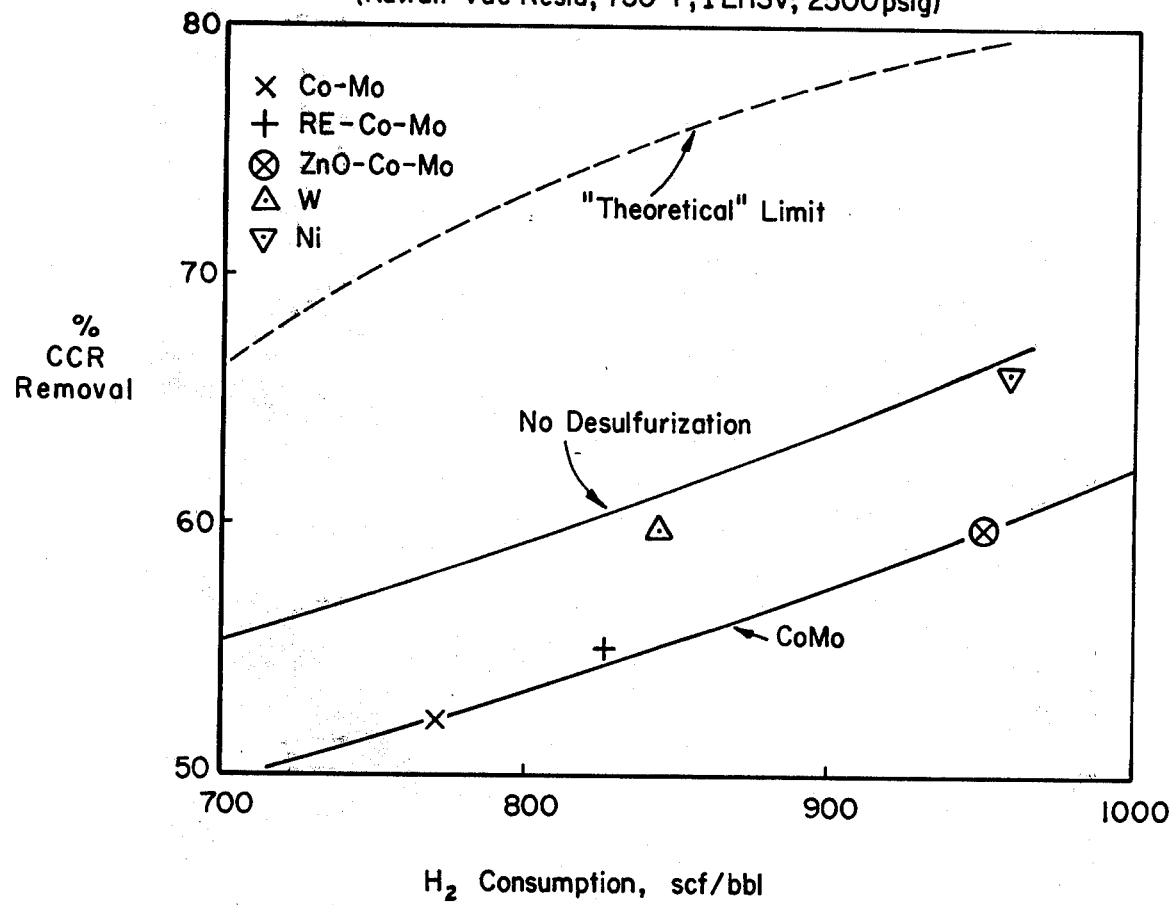

UPGRADING RESIDUAL OIL

BACKGROUND OF THE INVENTION

1. Field of the Invention

This invention is concerned with upgrading residual petroleum fractions to selectively reduce CCR without undue hydrogen consumption. More particularly, the invention involves the use of hydrotreating with a novel catalyst to render residual fractions quite suitable as feedstocks in a subsequent coking operation.

2. Description of the Prior Art

Coking is one of the refiner's major processes for converting residuals to lighter, more valuable stocks. Petroleum coke is the residue resulting from the thermal decomposition or pyrolysis of high-boiling hydrocarbons, particularly residues obtained from cracking or distillation of asphaltenic crude distillates. The hydrocarbons generally employed as feedstocks in the coking operation usually have an initial boiling point of about 380° C. (700° F.) or higher, an API gravity of about 0° to 20°, and a Conradson carbon residue content of about 5 to 40 weight percent.

The coking process is particularly advantageous when applied to refractory, aromatic feedstocks such as slurry decanted oils from catalytic cracking and tars from thermal cracking. In coking, the heavy aromatics in the resid are condensed to form coke. During coking, about 15-25 weight percent of the charge goes to form coke. The remaining material is cracked to naphtha and gas oil that can be charged to reforming and catalytic cracking.

Residual petroleum oil fractions such as those fractions produced by atmospheric and vacuum crude distillation columns are typically characterized as being undesirable as feedstocks for direct use in most refining processes. This undesirability is due primarily to the high content contaminants, i.e. metals, sulfur, nitrogen and Conradson carbon residue, in said fractions.

Principal metal contaminants are nickel and vanadium, with iron and small amounts of copper also sometimes present. Additionally, trace amounts of zinc and sodium are found in most feedstocks. As the great majority of these metals when present in crude oil are associated with very large hydrocarbon molecules, the heavier fractions produced by crude distillation contain substantially all the metal present in the crude, such metals being particularly concentrated in the asphaltene residual fraction. The metal contaminants are typically large organo-metallic complexes such as metalloporphyrins and similar tetrapyrrole structures.

The residual fraction of single stage atmospheric distillation or two stage atmospheric/vacuum distillation also contains the bulk of the crude components which deposit as carbonaceous or coke-like material on cracking catalysts without substantial conversion. These are frequently referred to as "Conradson Carbon" from the analytical technique of determining their concentration in petroleum fractions.

In the past, and to a certain extent under present operating schemes, high molecular weight stocks containing sulfur, nitrogen and metals have often been processed in a coking unit to effectively remove metals and some of the sulfur (these contaminants remaining in the solid coke). However, there are limits to the amount of metals and sulfur that can be tolerated in the produced coke if it is to be saleable. Hence, considerable effort has been expended for effecting the removal and recovery of metallic and non-metallic contaminants from various fractions of petroleum oils so that conversion of such contaminated charges to more desirable products may be effectively accomplished.

Typically, metals and sulfur removal has been accomplished by the use of hydrotreatment or hydroprocessing. Such hydrotreatment involves the utilization of hydrogen in conjunction with a catalyst comprising a Group VIIIA metal, (or metal oxide or metal sulfide or metal oxysulfide), e.g., Fe, Co, Ni, etc. and a Group VIA metal, (or metal oxide, or metal sulfide, or metal oxysulfide), e.g., Mo, W, etc. deposited on a porous refractory support, e.g., alumina. Among such catalysts, cobalt-molybdenum, or nickel-cobalt-molybdenum supported on alumina are considered to be preferred catalysts because they exhibit good activity for desulfurization, demetalation and for CCR reduction. The pore size distribution of these catalysts was determined to be an important parameter in ascertaining their demetalating and desulfurizing activities. Generally for a given catalyst pore volume, large pore catalysts possess greater demetalating activity than small pore catalysts; small pore catalysts generally posses greater desulfurizing activity than large pore catalyst. There are a great number of patents covering hydrotreating and the following U.S. patents are representative of the art: U.S. Pat. Nos. 3,876,523; 3,931,052; 4,016,067; 4,054,508; and 4,082,695. U.S. Pat. No. 3,684,688 describes a process for increasing normal liquid hydrocarbon yields from coking a hydrocarbon feed.

The prior art has been primarily concerned with hydrotreating coker feed to remove metals and sulfur with less attention afforded to CCR reduction and conserving hydrogen. Thus, the preferred catalysts such as $CoMo/Al_2O_3$ and $NiMo/Al_2O_3$ are active desulfurizers and as such require a large consumption of hydrogen for desulfurization purposes, thus necessitating additional hydrogen for CCR reduction. In general, non-metallic heteroatom, e.g., sulfur, nitrogen and oxygen, removal accounts for about 5-20% of the hydrogen consumed in residuum hydroprocessing. In stocks such as tar sands bitumen where the heteroatom content is even greater, the hydrogen requirement for heteroatom removal is thus increased.

As previously stated, pore size distribution is an important hydroprocessing catalyst parameter with desulfurization catalysts usually designed to have small pore sizes, e.g., an average pore size of about 100 Angstroms and less. This small pore size permits a high surface area at a given catalyst pore volume. Since the majority of the hydrocarbon molecules which contribute to CCR are large asphaltenic types, conventional small pore desulfurization catalysts would diffusionally restrict the CCR-type materials from being hydrogenated. As a result, the hydrogenation of hydrocarbons is preferentially accomplished on the smaller molecular size portion, and hydrogen consumption is not efficiently utilized for achieving a reduction in CCR.

It is one object of the present invention to provide means to selectively reduce CCR in a residual fraction without needlessly consuming addition hydrogen for other functions, e.g. desulfurization and demetalation. It is another object of this invention to provide means to upgrade residual fractions for use in coker units to reduce coke make.

SUMMARY OF THE INVENTION

It has now been discovered that hydrocarbon oils, preferably residual fractions are catalytically hydroprocessed to selectively reduce Conradson carbon residue without needlessly consuming additional hydrogen for other functions, e.g. desulfurization and demetalation. The residual fraction processed according to this invention would serve as an excellent feed for coking in that coke make would be reduced. The reduction of coke yield made affordable by implementation of the instant invention would allow refiners to either process more crude or use lower quality crude without increasing coking capacity.

The novel process of this invention involves the contacting of hydrocarbon oil, preferably residual oil under conversion conditions, with hydrogen and a novel catalyst. The novel catalyst comprises a metal function deposited on a porous refractory inorganic support with the catalyst characterized by having greater than about 50% its pore volume contribution in pores having diameters in the range of about 100 to 200 Angstroms. Said metal function may be unimetallic or multimetallic and may be a metal, metal oxide, metal sulfide, or metal oxysulfide. Appropriate metal functions include Ni, W, Fe, Mo, Pd, Fe-Ni, Pd-W, etc.

BRIEF DESCRIPTION OF THE DRAWING

The drawing is a plot of %CCR removal versus hydrogen consumption for various catalysts in hydroprocessing Kuwait vacuum resid.

DESCRIPTION OF THE PREFERRED EMBODIMENTS

The feedstock to the novel process of this invention can be a whole crude. However, the preferred feedstock will be one derived from the bottoms fraction of a petroleum oil, i.e., one which is obtained by atmospheric distillation of a crude petroleum oil to remove lower boiling materials such as naphtha and furnace oil, or by vacuum distillation of an atmospheric residue to remove gas oil.

Typical residues to which the present invention is applicable will normally be substantially composed of residual hydrocarbons boiling above 480° C. (900° F.) and containing a substantial quantity of asphaltic materials. Thus, the chargestock can be one having an initial or 5 percent boiling point somewhat below 480° C. (900° F.) provided that a substantial proportion, for example, about 40 or 50 percent by volume, of its hydrocarbon components boil above 480° C. (900° F.). A hydrocarbon stock having a 50 percent boiling point of about 480° C. (900° F.) and which contains asphaltic materials, 4% by weight sulfur and 51 ppm nickel and vanadium is illustrative of such chargestock.

The process of this invention is also applicable to other refinery streams such as clarified slurry oil, solvent extract, syntower bottoms and deasphalter tar. Also the hydrocarbon product from coal liquefaction, shale oil processing, tar sands extraction, biomass conversion and other such products from synthetic fuel production could be used as feedstocks for this process.

The novel catalyst of the instant invention comprises a metal function which is deposited on a porous refractory inorganic support. The metal function is a metal, metal oxide, or metal sulfide and may be unimetallic or multimetallic. Unimetallic metal functions include Mo, W, Fe, Ni or Pd, with W and Ni preferred and with W being most preferred. Multimetallic metal functions include most combinations of the aforesaid metal functions, with bimetallic metal functions being preferred over other multimetallic forms. Non-limiting examples of preferred bimetallic metal functions include Fe-Ni, Pd-W, Pd-Mo, Fe-Mo, Ni-Pd, Ni-Fe, Pd-Fe, and Fe-W. Combinations such as NiMo (and CoMo) and NiW would not be desirable metal functions under the instant invention due to their high desulfurization activities and concomitant addition hydrogen consumption.

The above described metal function is deposited on an porous inorganic refractory support. Non-limited examples of such porous inorganic refractory supports useful in the present invention include alumina, silica-alumina, silica-magnesia, titania, zirconia, titania-zirconia, silica-zirconia-alumina, titania-alumina, titania-silica-alumina, silica-alumina-boria, boria, strontia, hafnia, magnesia-titania, activated carbon, just to name a few. The preferred support is alumina.

The concentration of the metal function is primarily dependent upon the particular metal or combination of metals utilized, as well as the characteristics of the charge stock. It is usually preferred to use between about 0.5 and 15.0 weight percent of the Group VIA metal (Mo, W). The group VIIIA metals (Fe, Ni, Pd) are preferred in amounts of between about 0.1 and 15.0 weight percent. The remainder of the weight is occupied by support material.

The pore size distribution of the novel catalysts of this invention is an important parameter. The catalyst useful herein can be generally described as a large pore, CCR-selective catalyst. The term "large pore" denoting that the active metal function component is dispersed on the support, preferably alumina, in such a way as to have a good deal of its pore volume in the 100–200 Angstrom diameter range. Without wishing to be bound by any particular theory of operability, it is believed that this pore size distribution criterion is necessary to permit complete accessibility of the asphaltenic molecules into the catalyst particles. The metal function is to be dispersed so as to have greater than about 50%, and more preferably greater than about 60%, of its pore volume contribution in pores having diameters in the range of between about 100 and 200 Angstroms. Additionally, it is preferable that the catalyst have at least about 30% of its pore volume contribution in pores having diameters of about 0 to 50 Angstroms.

When the use of a catalyst in sulfided form is desired, the catalyst can be presulfided, after calcination, or calcination and reduction, prior to contact with the chargestock, by contact with a sulfiding mixture of hydrogen and hydrogen sulfide, at a temperature in the range of about 205° C. (400° F.) to 430° C. (800° F.) at atmospheric or elevated pressures. Presulfiding can be conveniently effected at the beginning of an onstream period at the same conditions to be employed at the start of such period. The exact proportions of hydrogen and hydrogen sulfide are not critical, and mixtures containing low or high proportions of hydrogen sulfide can be used. Relatively low proportions are preferred for economic reasons. When the unused hydrogen and hydrogen sulfide utilized in the presulfiding operation is recycled through the catalyst bed, any water formed during presulfiding is preferably removed prior to recycling through the catalyst bed. It will be understood that elemental sulfur or sulfur compounds, e.g. mercaptans, or carbon desulfide that are capable of yielding hydrogen sulfide at the sulfiding conditions, can be used in lieu of hydrogen sulfide.

Although presulfiding of the catalyst is preferred, it is emphasized that this is not essential as the catalyst will normally become sulfided in a very short time by contact, at the process conditions disclosed herein, with the high sulfur content feedstocks to be used.

Conversion conditions for hydroprocessing in accordance with the invention include a temperature of between about 345° C. (650° F.) and 460° C. (850° F.), preferably between about 390° C. (725° F.) and 430° C. (800° F.), a pressure of between about 6900 kPa (1000 psig) and 20,700 kPa (3000 psig), preferably between about 13,800 kPa (2000 psig) and 17,250 kPa (2500 psig), a liquid hourly space velocity (LHSV) of between about 0.5 and 4, preferably between about 1 and 2 and a hydrogen circulation rate of between about 1000 and 20,000 scf/bbl and preferably between about 5000 and 10,000 scf/bbl.

The hydrogen purity may vary from about 60 to 100 percent. If the hydrogen is recycled, which is customary, it is desirable to provide for bleeding off a portion of the recycle gas and to add makeup hydrogen in order to maintain the hydrogen purity within the range specified. Satisfactory removal of hydrogen sulfide from the recycled gas will ordinarily be accomplished by such bleed-off procedures. However, if desired, the recycled gas can be washed with a chemical absorbent for hydrogen sulfide or otherwise treated in known manner to reduce the hydrogen sulfide content thereof prior to recycling.

Coking of the hydrotreated residual oil produced according to the novel process of the present invention is typically conducted in a reactor or drum operated at a temperature of between about 430° C. (800° F.) and 600° C. (1100° F.) and a pressure of between about 100 kPa (1 atm.) and 1000 kPa (10 atm.). Coking generally involves the preheating of the feedstock (residuum) to cracking temperatures. The hot feedstock is then directed to a fractionator to remove over-head gases, gasoline range material (naphtha) and coker gas oil. The bottoms material from the fractionator is again heated and directed to the coke drums. The basic processes presently employed for coking are delayed coking and fluid coking. In delayed coking, the coke is formed in drums which periodically (once a day) must have the coke mechanically removed. In fluid coking, the coke is formed as fluid particles and can be continually withdrawn. If the residual charge is low in metals and sulfur, coke produced by the delayed process can be calcined and used in the production of anodes, pigments, etc.

The process of the present invention is very different from conventional hydrotreatment of residual fractions. The novel catalyst of the process of the instant invention is one whose primarily purpose is geared to limit hydrogen consumption for aromatics saturation and conversion of 540° C.+ (1000° F.+) material, i.e., reactions which selectively contribute to reduction of CCR. Catalysts which are active desulfurizers, e.g., CoMo/Al$_2$O$_3$, NiMolAl$_2$O$_3$, etc., needlessly consume additional hydrogen for the same CCR removal attainable with the novel catalyst of the present invention. Since the majority of the sulfur is rejected with the coke, prior sulfur removal during the hydroprocessing would be unnecessary if the major concern of the refiner was the liquid product from coking, rather than quality of the coke make. While dinitrogenation also can consume additional hydrogen, the small amount of nitrogen relative to sulfur renders dinitrogenation much less of a problem than desulfurization. Demetalation which also generally accompanies conventional hydrotreating of residual fraction is an undesirable reaction in the present system, since metals accumulation will cause catalyst deactivation. Thus the novel catalysts of this invention selectively reduce CCR without undue demetalation and desulfurization, with resultant savings in hydrogen consumption. Subsequent coking of such reduced CCR stock will lead to more liquid yield with less coke make. Refineries could then process more crude or lower quality crude without increasing coker capacity. Accordingly, the process of this invention can conveniently be placed in an existing refinery without additional hydrogen requirement. In one embodiment, the hydrogen required by the present process could be supplied by the reforming unit in an existing refinery.

The following examples serve to illustrate the invention without limiting same.

EXAMPLES 1–3

In Examples 1–3, three catalysts were evaluated for sulfur removal, metals removal (vanadium removal) and CCR removal (based on hydrogen content). Each catalyst was employed in a hydrotreating process with Kuwait vacuum resid at 1 LHSV, 400° C. (750° F.) and 17,250 kPa (2500 psig). In Example 1, a conventional hydrotreating catalyst was utilized, i.e. CoO-MoO$_3$/alumina. In Examples 2 and 3, catalysts representative of those of the present invention were employed, i.e., a W/alumina catalyst in Example 2 and a Ni/alumina catalyst in Example 3. Hydrotreating using these catalysts is summarized in Table 1. The results in Table 1 indicate that the W/Al$_2$O$_3$ and Ni/Al$_2$O$_3$ catalysts are shown to be more selective for CCR removal than the conventional catalyst.

Three curves are shown in the drawing which are plots of % CCR removal versus hydrogen consumption for hydroprocessing Kuwait vacuum resid for three catalysts. The lowest curve on the drawing is illustrative of CCR removal/hydrogen consumption behavior for a conventional hydroprocessing catalyst, namely CoMo/alumina. The intermediate curve represents the improved CCR removal selectively that a CoMo/Al$_2$O$_3$ catalyst could have if no desulfurization occurred. CCR removal/hydrogen consumption for two catalysts representative of this invention, i.e. W/alumina and Ni/alumina, lie near this intermediate curve thus indicating their high selectivity. The upper curve represents a so-called "theoretical limit" for CCR/removal/hydrogen consumption. To attain this limit all hydrogen consumption would have to go directly into increasing the hydrogen content of the liquid. That is to say, no light gas fraction or heteroatom removal is achieved. Moreover, hydrogenation preferentially occurs such that CCR precursive molecules are converted to non-CCR precursors.

TABLE 1

| Example No. | Catalyst Identification | % Sulfur Removal | % Vanadium Removal | % CCR Removal |
|---|---|---|---|---|
| 1 | CoO-MoO$_3$/alumina | 83 | 99 | 52 |
| 2 | 0.9 wt. % W/alumina | 5 | 0 | 15.3 |
| 3 | 1.0 wt. % Ni/alumina | 8 | 46 | 20 |

What is claimed is:

1. A process of upgrading a hydrocarbon oil fraction which comprises contacting a hydrocarbon oil fraction with hydrogen and a catalyst at conversion conditions including a temperature of from about 650° F. to about 850° F., a pressure of from about 1000 psig to about 3000 psig, a liquid hourly space velocity of from about 0.5 to about 4 and a hydrogen circulation rate of from about 1000 scf/bbl to about 20,000 scf/bbl, said catalyst comprising a porous inorganic refractory support having greater than about 50% of its pore volume contribution in pores having diameters of from about 100 to about 200 Angstroms and at least about 30% of its pore volume contribution in pores having diameters of from about 0 to about 50 Angstroms, said support having deposited thereon a metal or combination of metals, oxides, sulfides or oxysulfides thereof, said metal or combination of metals being selected from the group consisting of molybdenum, tungsten, iron, cobalt, nickel, palladium, molybdenum-tungsten, molybdenum-iron, molybdenum-palladium, tungsten-iron, tungsten-cobalt, tungsten-palladium, iron-cobalt, iron-nickel, iron-palladium, cobalt-nickel, cobalt-palladium and nickel-palladium, whereby the Conradson Carbon Residue of said fraction is selectively reduced.

2. The process of claim 1 wherein said porous inorganic refractory support has greater than about 60% of its pore volume contribution in pores having diameters in the range of between about 100 and 200 Angstroms.

3. The process of claim 1 wherein said support is alumina.

4. The process of claim 1 wherein said metal is tungsten.

5. The process of claim 1 wherein said metal is nickel.

6. The process of claim 1 wherein said conversion conditions include a temperature of between about 725° F. and 800° F., a pressure of between about 2000 psig and 2500 psig, a liquid hourly space velocity of between about 1 and 2 and a hydrogen circulation rate of between about 5,000 and 10,000 scf/bbl.

7. The process of claim 1 which further comprises coking said Cornadson Carbon Residue reduced fraction.

8. The process of claim 9 wherein said coking is conducted at a temperature of between about 800° F. and 1100° F. and at a pressure of between about 1 atm. and 10 atm.

9. A catalyst composition which comprises a porous inorganic refractory support having greater than about 50% of its pore volume contribution in pores having diameters of from about 100 to about 200 Angstroms and at least about 30% of its pore volume contribution in pores having diameters of from about 0 to about 50 Angstroms, said support having deposited thereon a metal or combination of metals, oxides, sulfides or oxysulfides thereof, said metal or combination of metals being selected from the group consisting of molybdenum, tungsten, iron, cobalt, nickel, palladium, molybdenum-tungsten, molybdenum-iron, molybdenum-palladium, tungsten-iron, tungsten-cobalt, tungsten-palladium, iron-cobalt, iron-nickel, iron-palladium, cobalt-nickel, cobalt-palladium, and nickel-palladium.

10. The catalyst composition of claim 18 wherein said porous inorganic refractory support has greater than about 60% of its pore volume contribution in pores having diameters in the range of between about 100 and 200 Angstroms.

11. The catalyst composition of claim 1 wherein said support is alumina.

12. The catalyst composition of claim 1 wherein said metal is tungsten.

13. The catalyst composition of claim 1 wherein said metal is nickel.

* * * * *

UNITED STATES PATENT AND TRADEMARK OFFICE
CERTIFICATE OF CORRECTION

PATENT NO. : 4,324,645

DATED : April 13, 1982

INVENTOR(S) : Philip J. Angevine and Thomas R. Stein

It is certified that error appears in the above—identified patent and that said Letters Patent is hereby corrected as shown below:

Col. 5, line 60     "NiMo1Al$_2$O$_3$" should be --NiMo/Al$_2$O$_3$--.

Col. 8, line 7     In Claim 8: "Claim 9" should be --claim 7--.

Col. 8, line 26     In Claim 10: "Claim 18" should be --claim 9--.

Col. 8, line 31     In Claim 11: "Claim 1" should be --claim 9--.

Col. 8, line 33     In Claim 12: "Claim 1" should be --claim 9--.

Col. 8, line 35     In Claim 13: "Claim 1" should be --claim 9--.

Signed and Sealed this

Twenty-fourth Day of August 1982

[SEAL]

Attest:

GERALD J. MOSSINGHOFF

*Attesting Officer*     *Commissioner of Patents and Trademarks*